United States Patent
Chen et al.

(10) Patent No.: US 7,351,392 B2
(45) Date of Patent: Apr. 1, 2008

(54) PROCESS FOR THE HIGH RECOVERY EFFICIENCY OF SULFUR FROM AN ACID GAS STREAM

(75) Inventors: Jen Kai Chen, Katy, TX (US);
Michael Arthur Huffmaster, Houston, TX (US)

(73) Assignee: Shell Oil Company, Hosuton, TX (US)

( * ) Notice: Subject to any disclaimer, the term of this patent is extended or adjusted under 35 U.S.C. 154(b) by 374 days.

(21) Appl. No.: 11/070,117

(22) Filed: Mar. 2, 2005

(65) Prior Publication Data
US 2005/0196338 A1 Sep. 8, 2005

Related U.S. Application Data

(60) Provisional application No. 60/549,685, filed on Mar. 3, 2004.

(51) Int. Cl.
*C01B 17/04* (2006.01)
*C01B 17/05* (2006.01)

(52) U.S. Cl. ............... 423/573.1; 423/574.1; 423/576.8; 423/DIG. 17; 435/266

(58) Field of Classification Search ............. 423/573.1, 423/574.1, 576.8, DIG. 17; 435/266
See application file for complete search history.

(56) References Cited

U.S. PATENT DOCUMENTS

| | | | |
|---|---|---|---|
| 3,985,861 A | 10/1976 | Hudson, Jr. ............... 423/244 |
| 4,428,921 A | 1/1984 | Seike ...................... 423/569 |
| 4,452,772 A | 6/1984 | Knoblauch et al. ......... 423/569 |
| 5,354,545 A | 10/1994 | Buisman ................. 423/242.1 |
| 5,468,458 A | 11/1995 | Watson .................... 423/222 |
| 5,965,100 A | 10/1999 | Khanmamedov ........ 423/576.8 |
| 6,056,934 A * | 5/2000 | Carlsen et al. ............. 423/522 |
| 6,156,205 A | 12/2000 | Buisman et al. ........... 210/620 |
| 6,221,652 B1 * | 4/2001 | Janssen et al. ............ 435/266 |
| 6,297,189 B1 | 10/2001 | Jin et al. ................... 502/218 |
| 6,432,873 B1 | 8/2002 | Khare et al. ............... 502/406 |
| 6,517,801 B2 | 2/2003 | Watson ................... 423/574.1 |
| 6,638,057 B2 | 10/2003 | Watson et al. ............. 431/174 |
| 6,656,249 B1 | 12/2003 | Buisman et al. ............. 95/195 |
| 6,696,284 B2 * | 2/2004 | Haridas et al. ............ 435/266 |
| 2001/0034056 A1 * | 10/2001 | Corey ..................... 435/266 |
| 2005/0214925 A1 * | 9/2005 | Chen et al. ................ 435/266 |

FOREIGN PATENT DOCUMENTS

| EP | 84410 | 7/1983 |
|---|---|---|
| EP | 244659 | 11/1987 |
| WO | 98/57731 | 12/1998 |

OTHER PUBLICATIONS

International Search Report for PCT/US2005/006690 of Jun. 22, 2005.
Written Opinion for PCT/US2005/006690 of Jun. 22, 2005.

* cited by examiner

*Primary Examiner*—Timothy C. Vanoy
(74) *Attorney, Agent, or Firm*—Charles W. Stewart

(57) ABSTRACT

A combined process for the recovery of sulfur from an acid gas stream. The combined process includes both a Claus unit and a unit for treating the Claus tail gas with caustic to remove hydrogen sulfide therefrom and to biologically oxidize the hydrogen sulfide using certain types of sulfur bacteria to make elemental sulfur. The combined process provides for an exceptionally low concentration of hydrogen sulfide in the finally treated sweet gas.

12 Claims, 2 Drawing Sheets

PROCESS FOR THE HIGH RECOVERY EFFICIENCY OF SULFUR FROM AN ACID GAS STREAM

This application claims the benefit of U.S. Provisional Application Ser. No. 60/549,685 filed Mar. 3, 2004.

BACKGROUND OF THE INVENTION

The invention relates to a process for the recovery of sulfur from an acid gas stream that comprises hydrogen sulfide. One aspect of the invention relates to a sulfur recovery process that includes both the catalytic and biological conversion of hydrogen sulfide to yield a sulfur product and a gas stream having a low concentration of hydrogen sulfide.

The removal of sulfur from process gas streams can be desirable or even necessary for a variety of reasons including, for example, the need to remove sulfur compounds from the process steams of chemical and hydrocarbon processing plants in order to comply with government regulations.

One well-known method that is used to treat certain process streams that contain hydrogen sulfide to recover elemental sulfur is the Claus process. The Claus process is a two-step process that includes a thermal step followed by a catalytic step. In the thermal step, the hydrogen sulfide of a feed stream is partially oxidized by combustion with oxygen to form a combustion gas containing sulfur dioxide. The chemical reaction of the thermal step is represented by the following equation (1):

$$2H_2S + 3O_2 \rightarrow 2SO_2 + 2H_2O \qquad (1)$$

The hydrogen sulfide and the formed sulfur dioxide contained in the combustion gas can undergo the Claus reaction whereby they are reacted to form elemental sulfur in accordance with the following equation (2):

$$2H_2S + SO_2 \leftrightarrow 3S + 2H_2O \qquad (2)$$

Further in the Claus process, unreacted hydrogen sulfide and sulfur dioxide in the combustion gas are catalytically reacted in accordance with the Claus reaction equation (2) by passing the combustion gas over a Claus catalyst, which provides for a lower Claus reaction temperature. The Clause process also provides for the recovery of the formed elemental sulfur as a product and for the yielding of a Claus tail gas.

While the Claus process is very effective at providing for the recovery of a major portion of the sulfur in its feed stream, it still only provides for up to about 94 to 96 percent sulfur recovery with a two-bed catalytic Claus plant. Claus plants with three or more catalytic beds can provide for incremental improvements in sulfur recoveries, but the practical upper limit of sulfur recovery with a Claus plant alone is upwardly to about 97 to 98 percent. The tail gas from a Claus process, however, can further be treated so as to provide for the conversion of the residual hydrogen sulfide and sulfur dioxide and the recovery of additional sulfur. With Claus tail gas treatment, e.g., the SCOT process, the overall sulfur recovery can approach upwardly to about 99 to 99.8 percent.

There is an ongoing need for improved sulfur recovery processes that provide for high sulfur recovery and better operating efficiencies preferably with lower capital costs. With increasingly more stringent sulfur emission standards, there is also a need for sulfur recovery processes that provide for even greater sulfur recoveries from process streams containing sulfur compounds than are provided by conventional sulfur recovery systems that include a Claus unit coupled with a Claus tail gas treatment unit.

It is thus an object of the inventive process to provide for a high sulfur recovery from a process stream containing a sulfur compound.

Another object of the invention is to provide a process for efficiently recovering sulfur from a process steam containing a sulfur compound.

Accordingly, one embodiment of the invention includes a sulfur recovery process. In this process an acid gas stream comprising hydrogen sulfide is charged as a feed to a sulfur recovery system operated so as to yield a first sulfur product and a Claus tail gas comprising hydrogen sulfide and less than about 1000 ppmv sulfur dioxide. The Claus tail gas is then charged to a biological gas desulfurization system operated to yield a second sulfur product and a sweet gas comprising less than 100 ppmv hydrogen sulfide.

Another embodiment of the invention includes a process for the recovery of sulfur from an acid gas stream. This process includes a Claus sulfur recovery step in combination with a biological sulfur recovery step to provide a sweet gas stream having a very low concentration of hydrogen sulfide and sulfur dioxide. The acid gas steam is reacted with oxygen under such oxidation conditions to yield a combustion gas comprising hydrogen sulfide and sulfur dioxide so as to have a ratio of hydrogen sulfide to sulfur dioxide exceeding 2:1. The combustion gas is reacted under Claus reaction conditions to yield a reaction gas comprising sulfur. Sulfur is recovered from the reaction gas to yield a tail gas comprising a concentration of hydrogen sulfide and less than 1000 ppmv sulfur dioxide. The tail gas is contacted with a lean absorbent thereby remove from the tail gas a portion of the hydrogen sulfide contained therein and to yield a sweet gas and a rich solvent comprising dissolved hydrogen sulfide. The dissolved hydrogen sulfide of the rich solvent is biologically oxidized to elemental sulfur by contacting the rich solvent with sulfur bacteria under suitable biological oxidation conditions with the rich solvent.

A yet another embodiment of the inventive process includes passing an acid gas stream comprising hydrogen sulfide to a combustion zone for partially oxidizing the hydrogen sulfide in the acid gas stream with oxygen to form sulfur dioxide thereby providing a combustion gas stream comprising sulfur dioxide and hydrogen sulfide. The amount of hydrogen sulfide oxidized in the combustion zone is controlled such that less than 33 volume percent of the hydrogen sulfide in the acid gas stream is oxidized to sulfur dioxide. The combustion gas stream is then passed to a Claus reaction zone operated under Claus conversion conditions to yield a reaction gas comprising sulfur. Sulfur is recovered from the reaction gas to yield a Claus tail gas comprising a concentration of hydrogen sulfide. The Claus tail gas is passed to an absorption zone for contacting the Claus tail gas with a lean caustic solution whereby hydrogen sulfide is recovered from the Claus tail gas and from which is yielded a sweet tail gas and a rich caustic solution. The rich caustic solution is passed to a bioreaction zone for the biological oxidation of the dissolved sulfide in said rich caustic solution to elemental sulfur.

Other objects and advantages of the invention will become apparent from the following detailed description and appended claims.

DETAILED DESCRIPTION OF THE INVENTION

Figure 1:
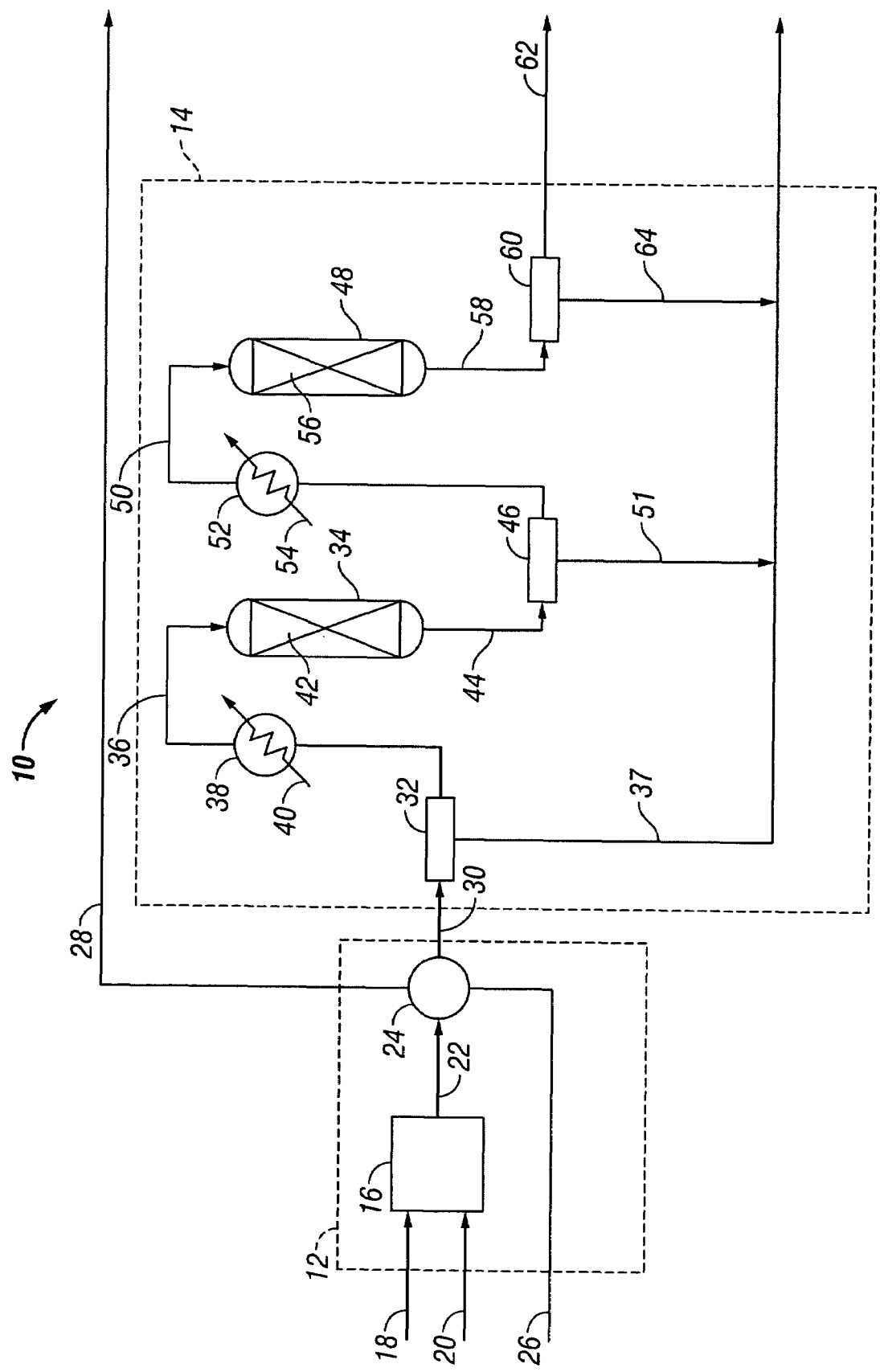
FIG. 1 is a schematic diagram representing certain aspects of the Claus process system and Claus process step of the inventive sulfur recovery process.

The inventive process provides for the high recovery efficiency of sulfur from an acid gas stream, and, thus, for the deep hydrogen sulfide removal from a gas stream containing hydrogen sulfide. One feature of the inventive process includes arranging a sulfur recovery process system in combination with a biological gas desulfurization process system. This arrangement provides for the processing of an acid gas stream and for the high recovery efficiency of sulfur from the acid gas stream thereby providing for a sulfur product and a sweet gas product stream having extremely low concentrations of hydrogen sulfide and sulfur dioxide.

The sulfur recovery process of the invention includes charging an acid gas stream that comprises hydrogen sulfide ($H_2S$) to a Claus sulfur recovery system. The Claus sulfur recovery system can be any suitable process system for processing an acid gas stream to yield a sulfur product and a Claus tail gas having a concentration of $H_2S$. The Claus sulfur recovery process is a known process for the recovery of sulfur from acid gas streams, and it can provide for reasonably high sulfur recoveries. But, in cases where extremely high sulfur recoveries are desired or required, a Claus sulfur recovery process or system will not provide such a high recovery. Thus, in accordance with the invention, the Claus system is coupled with a biological gas desulfurization system, which processes the Claus tail gas, to provide for additional incremental sulfur removal from the Claus tail gas so as to provide a sweet tail gas having a significantly lower concentration of $H_2S$ than that of the Claus tail gas and to provide for an enhancement of overall sulfur recovery from the acid gas stream.

The sweet tail gas, thus, can have a concentration of $H_2S$ that is less than, preferably, significantly less than, the concentration of $H_2S$ of the Claus tail gas. The inventive process, therefore, provides for a particularly deep removal of $H_2S$ from the acid gas by providing a sweet tail gas generally having a concentration of $H_2S$ that is less than about 2000 parts per million volume (ppmv), but it is desirable for the concentration of $H_2S$ in the sweet tail gas to be less than 100 ppmv. The inventive process can even provide for the preferred concentration of $H_2S$ in the sweet tail gas that can be as low as less than 50 ppmv and, most preferably, the $H_2S$ concentration in the sweet tail gas is less than 10 ppmv and even less than 5 ppmv or 1 ppmv. A practical lower limit for the $H_2S$ concentration in the sweet tail gas is around 100 parts per billion volume (ppb) or 10 ppb.

The Claus sulfur recovery system can include combustion means and reaction means respectively providing for the thermal step and the catalytic step of a Claus process to thereby give a Claus sulfur product and Claus tail gas. The combustion means can include a furnace equipped with burners, or any other suitable combustion device, for receiving the acid gas and an oxygen-containing gas, such as air, and for burning or combusting a portion of the $H_2S$ contained in the acid gas to sulfur dioxide ($SO_2$) in accordance with Equation (1) above. The combustion means, thus, defines a combustion or thermal zone wherein the $H_2S$ of the acid gas is partially oxidized to form a combustion gas stream, which comprises hydrogen sulfide and sulfur dioxide.

The acid gas feed to the combustion means of the Claus system can be from any source and, as the term is used herein, acid gas refers to a fluid stream that comprises $H_2S$ usually at a significant concentration level. The acid gas feed can also comprise other components, such as, for example, carbon dioxide, or nitrogen, or hydrocarbon, or ammonia, or a combination of one or more of such listed components. The composition of the acid gas feed can, however, vary depending upon its source and other factors. A common source of the acid gas is from a conventional main gas treating system used to remove hydrogen sulfide from fluid streams containing such.

The concentration of $H_2S$ of the acid gas feed can, generally, range from about 5 volume percent of the total volume of the acid gas feed stream to about 98 volume percent. Typically, however, the $H_2S$ concentration in the acid gas feed stream is in the range of from 50 volume % to 95 volume %, and, more typically, from 80 volume % to 94 volume %. The following Table 1 presents typical composition and concentration ranges for the various components of an acid gas stream.

TABLE 1

Typical Composition of Acid Gas Feed Stream to Claus Unit

| Component | Concentration Range (volume %) |
|---|---|
| Hydrogen sulfide ($H_2S$) | 5 to 98 |
| Carbon Dioxide ($CO_2$) | 1 to 90 |
| Hydrocarbons | 0.1 to 2 |
| Nitrogen ($N_2$) | 0.1 to 1 |
| Ammonia ($NH_3$) | Up to 50 |
| Other | 0.1 to 1 |

The combustion gas stream is passed to Claus reaction means that can include a Claus reactor, which contains a suitable Claus catalyst, and a sulfur condenser. The Claus reaction means defines the Claus catalytic reaction zone, containing a Claus catalyst such as activated alumina, and the sulfur-condensing zone. The Claus reaction means provides for the reaction of the $H_2S$ and $SO_2$ of the combustion gas in accordance with Equation (2) above. The Claus reaction means further provides for the recovery of the Claus sulfur product and the yielding of the Claus tail gas. A typical Claus tail gas comprises both $H_2S$ and $SO_2$. The following Table 2 presents typical composition and concentration ranges for the various components of a Claus tail gas stream.

TABLE 2

Typical Composition of Claus Tail Gas For Conventional Claus Unit Operation

| Component | Concentration Range (volume %) |
|---|---|
| Hydrogen Sulfide ($H_2S$) | 0.2 (2,000 ppmv) to 2 (20,000 ppmv) |
| Sulfur Dioxide ($SO_2$) | 0.1 (1,000 ppmv) to 1 (10,000 ppmv) |
| Carbon Monoxide (CO) | 0.5 to 2 |
| Hydrogen ($H_2$) | 1 to 3 |
| Nitrogen ($N_2$) | 20 to 80 |
| Carbon Dioxide ($CO_2$) | 20 to 80 |
| Water ($H_2O$) | 10 to 35 |
| Argon (Ar) | 0.5 to 1 |
| Other Sulfur Compounds | 0.12 to 1.2 |

The Claus tail gas is charged to a biological gas desulfurization system that provides a process step for the removal of $H_2S$ from a Claus tail gas to yield a sweet tail gas and for the conversion of the removed $H_2S$ to yield a bioreactor sulfur product. The biological gas desulfurization system can be any suitable process system providing for a biological method for the processing of a fluid stream containing a concentration of $H_2S$ to remove therefrom the $H_2S$ and to yield the bioreactor sulfur product. An example of one such suitable biological gas desulfurization process is the Shell-Paques Process for the recovery of sulfur from fluid streams containing $H_2S$.

In a preferred embodiment of the invention, the biological gas desulfurization system comprises an arrangement of absorber means, bioreactor means and sulfur recovery means that in combination provide for the removal of $H_2S$ from the Claus tail gas and the conversion thereof to yield an elemental sulfur product and a sweet tail gas having a very low concentration of sulfur, such as, ultra low concentrations of $H_2S$ and $SO_2$. The absorber means of the biological gas desulfurization system can include, for example, a contacting vessel, such as an absorber, or any other suitable contacting device, that defines a contacting or an absorption zone wherein the Claus tail gas is contacted with a lean solvent to yield the sweet tail gas and a rich solvent containing dissolved hydrogen sulfide.

The lean solvent of the biological gas desulfurization system can include any solvent that suitably provides for the scrubbing of $H_2S$ from the Claus tail gas preferably by the provision of hydroxide ions that can react with the $H_2S$ of the Claus tail gas to form sulfide ions that become dissolved in the resulting rich solvent. Thus, the lean solvent can be an alkaline solution such as a solution comprising sodium hydroxide or potassium hydroxide, or a mixture of both. It is desirable for the lean solvent to be a buffered alkaline solution of sodium hydroxide, or caustic, and for the lean solvent to have a pH exceeding 7, such as being in the range of from above 7 to 14. Preferably, the pH of the lean solvent is in the range of from about 7.5 to about 12, and, most preferably, from 8 to 10.

The lean solvent is contacted with the Claus tail gas under such suitable absorption conditions as to provide the sweet tail gas and the rich solvent. The rich solvent is then passed to bioreactor means that defines a bioreaction zone and provides means for biologically oxidizing the dissolved hydrogen sulfide contained in the rich solvent to elemental sulfur. The bioreaction zone is operated under suitable biological oxidation conditions in the presence of oxygen so that sulfur bacteria contained therein converts the sulfide contained in the rich solvent to form elemental sulfur and hydroxide ions thereby providing for the regeneration of the rich solvent to yield the lean solvent. As a result of this biological oxidation, the lean solvent can contain elemental sulfur generally in the form of sulfur particles.

Any sulfur bacteria that suitably provides for the conversion of the dissolved hydrogen sulfide contained in the rich solvent to elemental sulfur can be used in the bioreaction zone. Possible species and strains of sulfur bacteria may be selected from those classified within the genera of *Beggiatoa, Thiothrix*, and *Thiobacillus*. The source of the sulfur bacteria is not important, and any suitable sulfur bacteria may be used to biologically oxidize the $H_2S$ of the rich solvent; provided, that, the sulfur bacteria used performs the above noted desired function of $H_2S$ conversion to elemental sulfur. Many of the suitable species of sulfur bacteria are naturally occurring and can be found in environments, including industrial and natural environments, where sulfur or sulfur compounds are present, such as in hot sulfur springs and their surrounding environment. The preferred genus from which the specie of sulfur bacteria for use in the bioreactor of the invention is selected is *Thiobacillus*.

To recover the sulfur formed in the bioreaction step, a portion of the lean solvent containing sulfur is passed to sulfur recovery means for recovering sulfur from the portion of lean solvent and to yield a second sulfur product, i.e. a bioreactor sulfur product, and a sulfur reduced lean solvent. One method of recovering the sulfur particles from the lean solvent includes passing it to sulfur settler means. The sulfur settler means can include a vessel, such as a sulfur settler, which defines a settling zone. The settling zone provides for a residence time for the lean solvent that allows the sulfur particles therein to settle. Thus, sulfur settler means provides for the separation of sulfur particles contained in the lean solvent thereby forming a slurry comprising sulfur particles. The sulfur particles of the slurry can then be separated by any suitable known method, such as, for example, centrifugal and decanting methods, to provide a bioreaction sulfur product and a sulfur reduced lean solvent, having a concentration of elemental sulfur below that of the lean solvent, that can be returned to the bioreactor means.

An important feature of the inventive process is in its operation in such a manner as to minimize the amount of $SO_2$ that is contained in the Claus tail gas charged to the biological desulfurization system. It is generally undesirable for the Claus tail gas that is introduced into the absorber of the biological gas desulfurization system to contain a significant concentration of $SO_2$ due to its reaction with the caustic of the lean solvent. In fact, there is a direct relationship between the $SO_2$ concentration of the Claus tail gas that is contacted with the caustic of the lean solvent and caustic consumption. Therefore, to lower caustic consumption in the operation of the biological desulfurization step, and, thus, operating cost, the $SO_2$ concentration in the Claus tail gas of the inventive process should be lowered prior to its processing by the biological desulfurization system. Another problem caused by the excessive concentration of $SO_2$ in the Claus tail gas is that it tends to lower, and even significantly lower, the pH of the solvent. This reduction in the solvent pH can impact in a negative way the $H_2S$ removal efficiency of the biological desulfurization system.

The concentration of $SO_2$ of the Claus tail gas of the inventive process should be less than the typical $SO_2$ concentrations in the Claus tail gas streams of conventionally operated Claus units. Thus, generally, the concentration of $SO_2$ of the Claus tail gas of the inventive process is, in general, less than 1,000 ppmv. But, as noted above, it is a most desirable aspect of the inventive process for the concentration of $SO_2$ in the Claus tail gas to be minimized, and, thus, it can be less than about 500 ppmv and even less than 300 ppmv. Preferably, the $SO_2$ concentration of the Claus tail gas of the inventive process is less than 100 ppmv, and, most preferably, less than 50 ppmv. A practical lower limit for the $SO_2$ concentration is around 100 ppb or 10 ppb.

In order to provide for the required concentration of $SO_2$ in the Claus tail gas feed to the biological desulfurization step of the inventive process, the Claus step is operated in a non-conventional manner. In the conventional operation of a Claus unit, it is important to combust in the thermal step an amount of the $H_2S$ contained in the acid gas feed such that the resulting combustion gas has a molar ratio of $H_2S$ to $SO_2$ that is as close as is possible to the stoichiometric ratio of 2:1 as required by the Claus reaction as presented in equation (2) above. Operating in this manner will minimize the amount of total sulfur, in the form of both $H_2S$ and $SO_2$, that passes with the Claus tail gas. Generally, to achieve an $H_2S$ to $SO_2$ molar ratio of about 2:1 in the combustion gas that is charged to the catalytic stage of the Claus unit, the thermal step is operated such that only about one-third volume or molar percent (about 33%) of the $H_2S$ charged to the combustion means of the Claus unit is converted or oxidized to $SO_2$. This, in accordance with equation (1) above, will provide an about 2:1 molar ratio of $H_2S$ to $SO_2$ in the combustion gas. To achieve this, the molar ratio of oxygen-to-hydrogen sulfide charged to the combustion means of the Claus unit is controlled to be about 0.5:1.

In contrast to the conventional method of operating a Claus unit, the inventive process herein intentionally operates the Claus process step of the invention in a manner, as noted above, to provide for a minimum concentration of $SO_2$ in the Claus tail gas. This is done by operating the thermal step of the Claus unit so that the combustion gas comprises hydrogen sulfide and sulfur dioxide in such relative proportions as to have therein a molar ratio of $H_2S$ to $SO_2$ that is greater than about 2:1, or greater than 2.125:1. It is preferred for the molar ratio of $H_2S$ to $SO_2$ in the combustion gas to be greater than 2.333:1 or even greater than 2.5:1, but it is recognized that the molar ratio should not be too large and that it should only be sufficiently large to provide for such a stoichiometric excess of $H_2S$ in the combustion gas feed to the Claus catalytic reaction step as to provide the desired minimum of $SO_2$ in the Claus tail gas. Therefore, a practical upper limit for the molar ratio of $H_2S$ to $SO_2$ in the combustion gas may be less than 6:1, or even, less than 4:1, or less than 3:1.

To provide for the desired combustion gas stream concentration and, thus, the required minimization of $SO_2$ in the Claus tail gas, the amount of $H_2S$ oxidized or combusted in the combustion zone of the Claus desulfurization step is controlled such that less than about 33 molar or volume percent thereof is converted to $SO_2$. The percent conversion of $H_2S$ in the combustion step of the Claus unit may, therefore, be in the range of from 32% to 15%. It is generally undesirable for the percentage of $H_2S$ combusted to become too low, and, thus, the lower end of the range for the amount of $H_2S$ combusted can be greater than 18% or greater than 20%. To achieve the desired minimization of $SO_2$ in the Claus tail gas, however, can require the percent $H_2S$ combusted to be less than 30% or even less than 28% or 25%.

The amount of $H_2S$ combusted in the thermal stage of the Claus desulfurization process further can be controlled by controlling the relative amount of oxygen charged with the $H_2S$ to the combustion means of the Claus thermal step so as to provide the desired $H_2S$ conversion. This is done by charging an oxygen-containing gas, comprising oxygen, along with the acid gas, to the combustion means in an amount such that the molar ratio of oxygen-to-hydrogen sulfide is less than about 0.5:1, or less than 0.48:1. A preferred molar ratio of oxygen-to-$H_2S$ is less than 0.45:1, and a more preferred molar ratio is less than 0.375:1 or even less than 0.3:1. The lower limit for the molar ratio of oxygen-to-$H_2S$ is greater than about 0.15:1, preferably, greater than 0.2:1, and, most preferably, greater than 0.25:1.

Now, presented in FIG. 1 is a schematic diagram representing the Claus sulfur recovery step 10 of the inventive process. The Claus sulfur recovery step includes a thermal or combustion step 12 and a catalytic step 14. An acid gas stream and an oxygen-containing gas stream are introduced into furnace 16, respectively, through lines 18 and 20. Furnace 16 provides for the partial combustion of the $H_2S$ of the acid gas stream to form $SO_2$. The resulting combustion gas stream passes from furnace 16 through line 22 to heat exchanger 24 whereby it is cooled by the indirect exchange of heat with water. The water is supplied to heat exchanger 24 through line 26 and steam passes from heat exchanger 24 through line 28.

The cooled combustion gas stream from heat exchanger 24 passes to catalytic step 14 of Claus sulfur recovery step 10 through line 30. The catalytic step 14 further includes passing the cooled combustion gas stream by way of line 30 to first sulfur condenser 32. First sulfur condenser 32 defines a condensation zone and provides means for condensing and separating liquid sulfur from the cooled combustion gas stream to thereby provide a first Claus reactor feed stream that is charged to first Claus reactor 34 by way of line 36. The separated liquid sulfur passes from first sulfur condenser 32 by way of line 37. Line 36 is in fluid flow communication with first sulfur condenser 32 and first Claus reactor 34 and interposed therein is first reheater 38, which defines a heat exchange zone and provides means for indirectly heating the first Claus reactor feed stream prior to charging it as a feed to first Claus reactor 34. Generally, steam is a suitable heat source and passes to first reheater 38 through line 40.

The first Claus reactor 34 defines a reaction zone that contains a catalyst bed 42 of a Claus catalyst, such as activated alumina. The first Claus reaction zone defined by first Claus reactor 34 is operated so as to provide for the contacting of the first Claus reactor feed stream with the Claus catalyst contained within the first Claus reaction zone under suitable Claus reaction conditions. A first Claus reactor effluent passes from first Claus reactor 34 through line 44 to second sulfur condenser 46. Second sulfur condenser 46 defines a condensation zone and provides means for condensing and separating liquid sulfur from the first Claus reactor effluent to thereby provide a second Claus reactor feed stream that is charged to second Claus reactor 48 by way of line 50. The separated liquid sulfur passes from second sulfur condenser 46 by way of line 51. Interposed in line 50 is second reheater 52, which defines a heat exchange zone and provides means for indirectly heating the second Claus reactor feed stream prior to charging it as a feed to second Claus reactor 48. Generally, steam is a suitable heat source and passes to second reheater 52 through line 54.

The second Claus reactor 48 defines a second Claus reaction zone that contains a catalyst bed 56 of a Claus catalyst, such as activated alumina. The second Claus reaction zone defined by second Claus reactor 48 is operated so as to provide for the contacting of the second Claus reactor feed stream with the Claus catalyst contained within the second Claus reaction zone under suitable Claus reaction conditions. A second Claus reactor effluent passes from second Claus reactor 48 through line 58 to third sulfur condenser 60. Third sulfur condenser 60 defines a condensation zone and provides means for condensing and separating liquid sulfur from the second Claus reactor effluent to thereby provide a Claus tail gas stream that is charged to the biological sulfur recovery step, not shown in FIG. 1 but shown in FIG. 2, by way of line 62. The separated liquid sulfur passes from third sulfur condenser 60 by way of line 64.

It is noted that the description herein of the Claus catalytic step 14 is with respect to two catalytic reaction steps that are arranged in series. But, it is understood that whether or not a Claus catalytic step is even used, or the exact number of Claus catalytic stages used, in the inventive process will depend upon the acid gas feed composition and other economic considerations. Therefore, references herein to the Claus process can mean a sulfur recovery process that includes a thermal step followed by a Claus reaction step in which elemental sulfur is formed by way of the Claus reaction as represented by equation (2) above either without the use of a Claus catalyst or with the use of a Claus catalyst and with the Claus reaction step being conducted in one or more reaction stages.

The liquid sulfur passing through lines 37, 51 and 64 pass from Claus sulfur recovery step 10 through line 66 as the first sulfur product of the inventive process.

Figure 2:
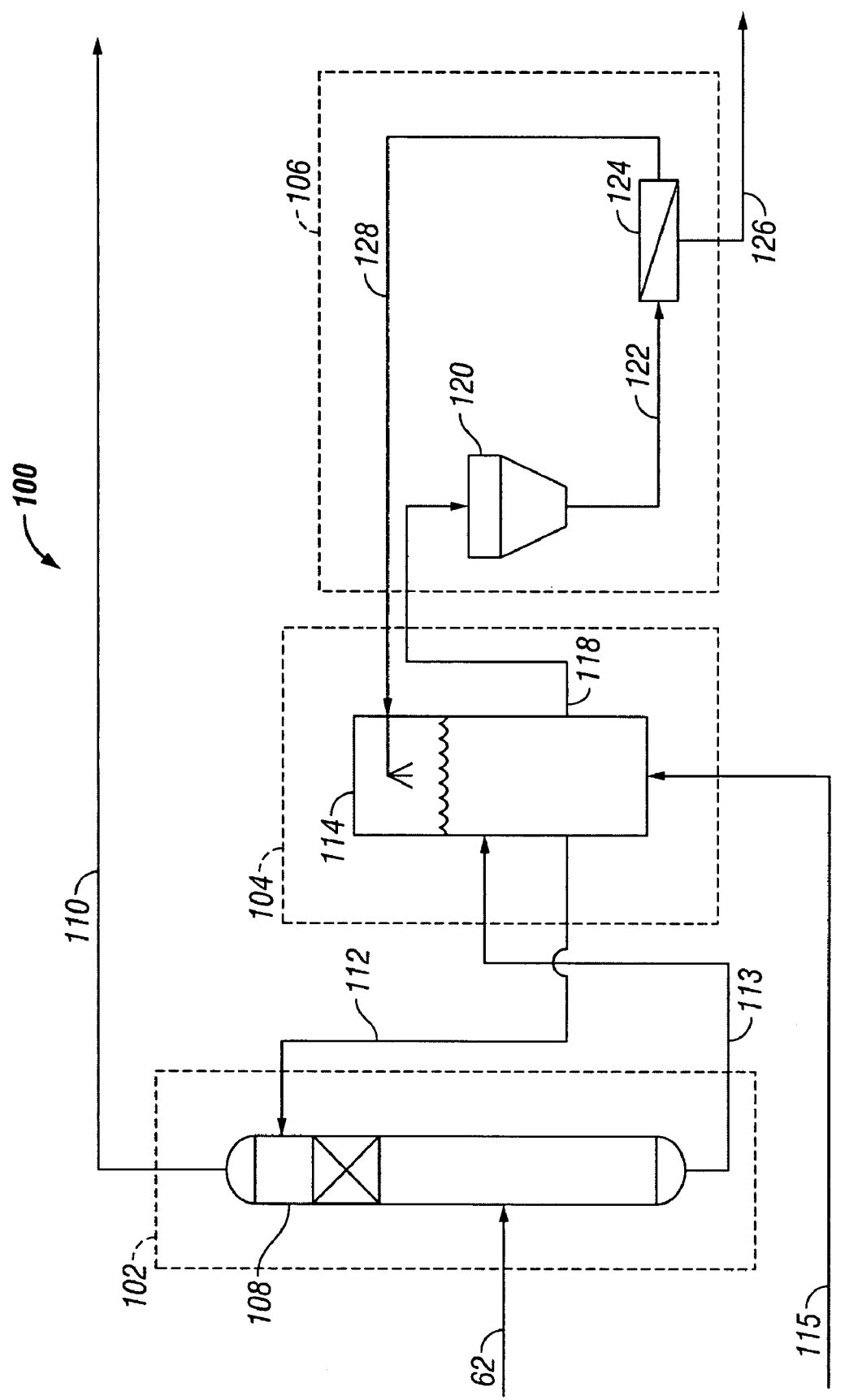
FIG. 2 is a schematic diagram representing certain aspects of the biological gas desulfurization system and biological conversion process step of the inventive sulfur recovery process.

Presented in FIG. 2 is a schematic diagram representing the biological sulfur recovery step 100 of the inventive process. The biological sulfur recovery step 100 includes absorption step 102, biological oxidation step 104 and sulfur separation step 106. The Claus tail gas stream passing from Claus sulfur recovery step 10 through line 62 is passed to absorption step 102 which provides for the contacting of the Claus tail gas with a lean solvent under suitable absorption conditions to thereby remove $H_2S$ and even $SO_2$, if present, from the Claus tail gas and to yield a sweet tail gas and a rich solvent. Providing for the absorption is absorber 108. Absorber 108 defines an absorption zone and provides means for the absorption of the $H_2S$ and $SO_2$ from the Claus tail gas to yield the sweet tail gas and rich solvent. The sweet tail gas passes from absorber 108 through line 110.

The lean solvent is introduced into absorber 108 by way of line 112, and the Claus tail gas is introduced into absorber 108 by way of line 62. Within absorber 108 the lean solvent and Claus tail gas are contacted together, preferably in a counter-current flow arrangement. The rich solvent passes from absorber 108 through line 113 to biological oxidation step 104, which provides for the contacting of the rich solvent and oxygen. The sulfur bacteria in the solvent provides for the oxidation of the sulfide dissolved in the rich solvent to elemental sulfur. Providing for the biological oxidation is bioreactor 114. Bioreactor 114 defines a biological oxidation or reaction zone and provides means for the biological oxidation or reaction of the dissolved sulfide contained in the rich solvent to yield the lean solvent. The lean solvent, thus, can contain sulfur. Bioreactor 114 provides for the biological oxidation by contacting the rich solvent under suitable bioreaction conditions, with sulfur bacteria and oxygen. Oxygen or air is introduced into bioreactor 114 to be contacted with the rich solvent by way of line 115.

Lean solvent passes from bioreactor 114 and is charged, as noted above, as a feed to absorber 108 through line 112 while a portion of the lean solvent from bioreactor 114 passes through line 118 to sulfur separation step 106. Sulfur separation step 106 provides for the removal of sulfur from the lean solvent to yield a bioreaction sulfur product and a sulfur reduced lean solvent. The separation step 106 includes the passing of the portion of lean solvent to sulfur settling vessel 120. Settling vessel 120 defines a settling zone that provides for a residence time for the lean solvent thereby allowing for the settling of the sulfur particles therein. A slurry comprising sulfur particles is removed from settling vessel 120 and passes therefrom through line 122 to a sulfur separation means 124, such as, for example, a centrifuge or a decanter. Sulfur separation means 124 defines a separation zone and provides means for separating sulfur from the slurry to yield the bioreactor sulfur product and the sulfur reduced lean solvent. The bioreactor sulfur product passes from sulfur separation means 124 through line 126. The sulfur reduced lean solvent is recycled to bioreactor 114 through line 128.

The following example is presented to further illustrate the invention, but it is not to be construed as limiting the scope of the invention.

EXAMPLE

This Example presents a typical acid gas feed composition that is charged to a typical two-stage Claus sulfur plant and the calculated tail gas compositions for a base case representing the standard operation of the Claus sulfur plant, i.e. a Claus reactor feed $H_2S$ to $SO_2$ molar ratio of 2:1, and an inventive case representing the method of operation of the Claus sulfur plant of the inventive process.

Presented in Table 3 below is a typical Claus sulfur plant acid gas feed stream, the calculated tail gas composition of the Claus sulfur plant when it is operated to obtain the typical 2:1 molar ratio $H_2S$ to $SO_2$ in the tail gas, and the calculated tail gas composition of the Claus sulfur plant when it is operated by reducing combustion air input to the Claus sulfur plant so as to obtain a 20:1 molar ratio $H_2S$ to $SO_2$ in the tail gas.

TABLE 3

Typical Claus Sulfur Plant Feed and Tail Gas Compositions and Exemplary Tail Gas Composition for the Operation of Claus Sulfur Plant of the Inventive Process

| Component | Feed Composition | Tail Gas Comp Base Case (%) | Tail Gas Comp Inventive Case (%) |
|---|---|---|---|
| $H_2$ |  | 2.05 | 2.09 |
| $CH_4$ | 1.0 |  |  |
| $H_2O$ | 6.0 | 34.99 | 35.08 |
| CO |  | 0.44 | 0.42 |
| $N_2$ |  | 58.68 | 58.15 |
| $CS_2$ |  | 0.01 | 0.01 |
| $H_2S$ | 85.0 | 0.50 (5000 ppmv) | 1.04 (10,040 ppmv) |
| $SO_2$ |  | 0.25 (2500 ppmv) | 0.05 (500 ppmv) |
| $CO_2$ | 8.0 | 2.94 | 3.03 |
| COS |  | 0.02 | 0.02 |
| Elemental S |  | 0.12 | 0.11 |
| Total | 100.0 | 100.0 | 100.0 |

As may be seen from the compositions presented in Table 3, with the inventive operation of the Claus plant a significantly lower concentration of $SO_2$ is provided in the tail gas stream and, thus, a significantly reduced amount of $SO_2$ is yielded with the tail gas stream as compared to the standard operation of a Claus plant. With the tail gas stream being charged to the caustic absorber of a biological sulfur recovery unit, the tail gas stream, with the much reduced $SO_2$ concentration, will provide for a reduced caustic consumption and, thus, reduced operating cost of the biological sulfur recovery unit.

Reasonable variations, modifications and adaptations can be made within the scope of the described disclosure and the appended claims without departing from the scope of the invention.

That which is claimed is:

1. A sulfur recovery process, comprising:
    charging an acid gas stream comprising hydrogen sulfide as a feed to a sulfur recovery system operated so as to yield a first sulfur product and a Claus tail gas comprising hydrogen sulfide and less than about 1000 ppmv sulfur dioxide;
    charging said Claus tail gas to a biological gas desulfurization system comprising absorber means for contacting said Claus tail gas with a lean solvent to yield a sweet gas and a rich solvent; bioreactor means for biologically oxidizing the dissolved hydrogen sulfide contained in said rich solvent and to yield a lean solvent containing sulfur; and sulfur recovery means for recovering sulfur from a portion of said lean solvent and to yield a second sulfur product and a sulfur reduced lean solvent and returning said sulfur reduced lean solvent to said bioreactor means; and operating said biological gas desulfurization system, wherein said lean solvent comprises an alkaline solution having a pH in the range of from 7.5 to 12 and sulfur bacteria capable of biologically oxidizing the dissolved hydrogen sulfide contained in said rich solvent and which is selected from the genera of *Beggiatoa, Thiothrix* and *Thiobacillus* to yield a second sulfur product and a sweet gas comprising less than 100 ppmv hydrogen sulfide.

2. A sulfur recovery process as recited in claim 1, wherein said sulfur recovery system comprises:
   combustion means for partially oxidizing the hydrogen sulfide in said acid gas stream to yield a combustion gas stream; and
   Claus reaction means for reacting said combustion gas stream to yield said Claus tail gas and said first sulfur product.

3. A sulfur recovery process as recited in claim 2, wherein said combustion gas stream comprises hydrogen sulfide and sulfur dioxide in such amounts as to have a molar ratio of hydrogen sulfide-to-sulfur dioxide that exceeds 2:1 but is less than 6:1.

4. A sulfur recovery process as recited in claim 3, wherein further charged to said combustion means of said sulfur recovery system is an oxygen-containing gas, comprising oxygen, in such an amount that the molar ratio of oxygen-to-hydrogen sulfide charged to said combustion means is less than 0.5.

5. A sulfur recovery process, comprising:
   passing an acid gas stream comprising hydrogen sulfide to a combustion zone defined by combustion means and providing for partially oxidizing the hydrogen sulfide in said acid gas stream with oxygen to form sulfur dioxide thereby providing a combustion gas stream comprising sulfur dioxide and hydrogen sulfide;
   controlling the amount of hydrogen sulfide oxidized in said combustion zone such that less than 1/3 (one third) of the hydrogen sulfide in said acid gas stream is oxidized to sulfur dioxide;
   passing said combustion gas stream to a Claus reaction zone operated under Claus conversion conditions to yield a reaction gas comprising sulfur;
   recovering sulfur from said reaction gas to yield a Claus tail gas comprising a concentration of hydrogen sulfide;
   passing said Claus tail gas to an absorption zone defined by absorber means for contacting said Claus tail gas with a lean caustic solution whereby hydrogen sulfide is recovered from said Claus tail gas and from which is yielded a sweet tail gas comprising less than 100 ppmv $H_2S$ and a rich caustic solution, wherein said lean caustic solution comprises an alkaline solution having a pH in the range of from 7.5 to 12 and sulfur bacteria capable of biologically oxidizing the dissolved hydrogen sulfide contained in said rich caustic solution and which is selected from the genera of Beggiatoa, Thiothrix and Thiobacillus, and wherein said sweet tail gas comprises less than 100 ppmv hydrogen sulfide; and
   passing said rich caustic solution to a bioreaction zone defined by bioreactor means for the biological oxidation of the dissolved sulfide in said rich caustic solution by use of said sulfur bacteria to elemental sulfur, yielding from said bioreaction zone said lean caustic solution;
   passing a portion of said lean caustic solution to sulfur recovery means for recovering sulfur from a portion of said lean caustic solution and to yield a sulfur reduced lean caustic solution and sulfur; and
   returning said sulfur reduced lean caustic solution to said bioreaction zone.

6. A sulfur recovery process as recited in claim 5, wherein said controlling step includes controlling the amounts of sulfur dioxide and hydrogen sulfide in said combustion gas stream such that said combustion gas stream further comprises a molar ratio of hydrogen sulfide-to-sulfur dioxide exceeding 2:1 but is less than 6:1.

7. A sulfur recovery process as recited in claim 6, wherein an oxygen-containing gas, comprising oxygen, is passed with said acid gas stream to said combustion zone in such an amount relative to said acid gas stream so that the molar ratio of oxygen-to-hydrogen sulfide passed to said combustion zone is less than 0.5.

8. A sulfur recovery process as recited in claim 5, wherein said sweet tail gas comprises less than 50 ppmv $H_2S$.

9. A sulfur recovery process, comprising:
   reacting an acid gas steam with oxygen under such oxidation conditions to yield a combustion gas comprising relative amounts of hydrogen sulfide and sulfur dioxide so as to have a ratio of hydrogen sulfide to sulfur dioxide exceeding 2:1 but is less than 6:1;
   reacting said combustion gas under Claus reaction conditions to yield a reaction gas comprising sulfur;
   recovering sulfur from said reaction gas to yield a Claus tail gas comprising a concentration of hydrogen sulfide and less than 1000 ppmv sulfur dioxide;
   contacting said Claus tail gas with a lean absorbent thereby removing from said Claus tail gas a portion of the hydrogen sulfide contained therein and to yield a sweet gas, comprising less than 100 ppmv $H_2S$, and a rich solvent comprising dissolved hydrogen sulfide; and
   biologically oxidizing the dissolved hydrogen sulfide of said rich solvent to elemental sulfur by contacting said rich solvent with a sulfur bacteria capable of biologically oxidizing the dissolved hydrogen sulfide of said rich solvent and which is selected from the genera of *Beggiatoa, Thiothrix* and *Thiobacillus* under biological oxidation conditions to yield a lean solvent containing said elemental sulfur, recovering said elemental sulfur from said lean solvent by use of sulfur recovery means for recovering sulfur from said lean solvent and to yield a sulfur product and a sulfur reduced lean solvent; and
   returning said sulfur reduced lean solvent to the bioreactor.

10. A sulfur recovery process as recited in claim 9, wherein said sweet gas comprises less than 50 ppmv $H_2S$.

11. A sulfur recovery process as recited in claim 9, wherein said sulfur bacteria includes those organisms of the genus *Thiobacilli*.

12. A sulfur recovery process as recited in claim 11, wherein said lean absorbent comprises a buffered alkaline solution.

* * * * *